United States Patent Office 3,239,486
Patented Mar. 8, 1966

3,239,486
STABILIZED EPIHALOHYDRIN COMPOSITIONS CONTAINING A NITROGEN ANTIOXIDANT AND A LEAD COMPOUND
William D. Willis, Wilmington, Del., assignor to Hercules Powder Company, Wilmington, Del., a corporation of Delaware
No Drawing. Filed Mar. 23, 1965, Ser. No. 442,185
20 Claims. (Cl. 260—45.75)

This application is a continuation-in-part of my copending application Serial No. 163,063, filed December 29, 1961, now abandoned.

This invention relates to stabilized compositions and more particularly to the stabilization of epihalohydrin polymers against degradation by heat, light and oxidation.

High molecular weight amorphous and crystalline polymers of epihalohydrin have recently been developed that show great promise in industrial application. The predominantly amorphous polymers are rubbery and can be used in foam rubber compositions, as adhesive components, etc. When the amorphous polymers are cross-linked (i.e., vulcanized) as, for example, with polyamines they can be used as specialty rubbers where their high resistance to organic solvents makes them particularly valuable. Those compositions containing a major proportion of crystalline polymers are more plastic and can be injection molded, extruded, or compression molded. However, all of these polymers are subject to considerable degradation during cross-linking or mechanically working as, for example, in compounding, extruding, molding and other processes because of the high temperatures required or generated during such processing. Degradation also occurs both before and after processing, as for example, on exposure of a finished article to heat and light.

Now in accordance with this invention it has been found that an epihalohydrin polymer, i.e., homopolymer, copolymer, terpolymer, etc., can be stabilized against heat, light and oxidation degradation by intimately admixing therewith a small amount of at least one lead compound selected from the group consisting of the lead salts of carbonic acid, the lead salts of unsaturated aliphatic carboxylic acids, the lead salts of aromatic carboxylic acids and the lead oxides in combintion with a small amount of at least one nitrogen-containing antioxidant. Such a stabilized composition is particularly advantageous when cross-linking, i.e., vulcanizing an epihalohydrin polymer with a polyamine, since it has unexpectedly been found that lower concentrations of the polyamine can be used than would otherwise be required while still maintaining a good state of cure. Although an antioxidant may give some stability to an epihalohydrin polymer composition for a short time at room temperature neither an antioxidant alone nor a lead compound alone will effectively resist heat and light aging degradation.

Any amorphous or crystalline epihalohydrin polymer containing at least 10% by weight of an epihalohydrin monomer can be stabilized in accordance with this invention. Suitable epihalohydrin polymers are the epihalohydrin homopolymers and copolymers of epihalohydrin with at least one other epoxide, preferably a vicinal monoepoxide. Typical epihalohydrin polymers are the epihalohydrin homopolymers such as poly(epichlorohydrin), poly(epibromohydrin), poly(epiiodohydrin) and poly(epifluorohydrin) and copolymers of two or more epihalohydrins such as epichlorohydrin-epibromohydrin copolymer, epichlorohydrin-epifluorohydrin copolymer, epibromohydrin-epiiodohydrin copolymer, etc.

Another group of epihalohydrin polymers which can be stabilized in accordance with this invention are the copolymers of an epihalohydrin and at least one other epoxide having the formula:

$$R_1-CH \overset{O}{\underset{}{\diagdown}} C \overset{R_2}{\underset{R_3}{\diagdown}}$$

where $R_1$, $R_2$, and $R_3$ are radicals selected from the group consisting of hydrogen, alkyl and alkoxyalkyl, but at least one of said R radicals being hydrogen; such as epichlorohydrin-propylene oxide copolymer, epichlorohydrin-ethylene oxide copolymer, epichlorohydrin-butene-1 oxide copolymer, epichlorohydrin-dodecene-1 oxide copolymer, epichlorohydrin-styrene oxide copolymer, epichlorohydrin-ethylene oxide-propylene oxide terpolymer, epibromohydrin-cis-butene-2 oxide copolymer, epichlorohydrin-trans-hexene-3 oxide copolymer, epichlorohydrin-cyclohexene oxide copolymer, epichlorohydrin-methyl glycidyl ether copolymer, epifluorohydrin-butyl glycidyl ether copolymer, epichlorohydrin-phenyl glycidyl ether copolymer, etc.

Another group of epihalohydrin polymers which can be stabilized in accordance with this invention are the copolymers of an epihalohydrin and at least one unsaturated glycidyl ether having the formula;

$$CH_2 \overset{O}{\underset{}{\diagdown}} CH-CH_2-O-R$$

where R is an ethylenically unsaturated radical, such as epichlorohydrin-vinyl glycidyl ether copolymer, epichlorohydrin-allyl glycidyl ether copolymer, epiiodohydrin-butenyl glycidyl ether copolymer, epichlorohydrin-4-vinylcyclohexyl glycidyl ether copolymer, epibromohydrin-abietyl glycidyl ether copolymer, epichlorohydrin-cyclohexenylmethyl glycidyl ether copolymer, epichlorohydrin-o-allylphenyl glycidyl ether copolymer, epichlorohydrin-ethylene oxide-allyl glycidyl ether terpolymer, epichlorohydrin-propylene oxide-allyl glycidyl ether terpolymer, epichlorohydrin-ethylene oxide-propylene oxide-allyl glycidyl ether tetrapolymer, etc.

Another group of epihalohydrin polymers which can be stabilized in accordance with this invention are the copolymers of an epihalohydrin and at least one glycidyl ester, such as epichlorohydrin-glycidyl methacrylate copolymer, epifluorohydrin-glycidyl crotonate copolymer, epichlorohydrin-glycidyl oleate copolymer, epichlorohydrin-glycidyl abietate copolymer, etc.

Still another group of epihalohydrin polymers which can be stabilized in accordance with this invention are the copolymers of an epihalohydrin and at least one monoepoxide of a diene or polyene such as epichlorohydrin-butadiene monoxide copolymer, epichlorohydrin-chloroprene monoxide copolymer, epibromohydrin-3,4-epoxy-1-pentene copolymer, epichlorohydrin-5-epoxy-1-hexene copolymer, epichlorohydrin-5,6-epoxy-2-hexene copolymer, epifluorohydrin-3,4-epoxy-1-vinylcyclohexene copolymer, epichlorohydrin- ,2 - epoxy-5,9-cyclododecadiene copolymer, epichlorohydrin-divinylbenzene monoxide copolymer, epichlorohydrin-butadiene monoxide-4,5-epoxy-2-pentene terpolymer, etc. In general the polymers will have a molecular weight of at least about 40,000.

The polymers stabilized in accordance with this invention can be prepared by contacting an epihalohydrin monomer, mixture of epihalohydrin monomers or mixture of epihalohydrin monomer and at least one other epoxide with an organoaluminum compound, preferably one which has been reacted with from about 0.01 to about 1.5 moles of a chelating agent such as acetylacetone, benzoylacetone, acetoacetic acid, ethyl glycolate, oxalic acid, glyoxal monoxime, etc., and/or reacted with from about 0.1 to about 1.5 moles of water per mole of the organoaluminum compound. Exemplary of the organoaluminum compounds that can be so reacted with the chelating agent and/or water and used as the catalyst are triethylaluminum, triisobutylaluminum, diethylaluminum hydride, etc.

The polymerization reaction is generally carried out in the presence of an inert, liquid, organic diluent but can be carried out in an essentially bulk polymerization process. Suitable diluents that can be used for the polymerization are the ethers, halogenated hydrocarbons, hydrocarbons and mixtures of such diluents. The temperature of the polymerization process can be varied over a wide range, generally from about −80° C. to about 250° C., and while atmospheric pressure is usually used, the pressure can be varied from subatmospheric up to several atmospheres.

The lead compounds which are used in combination with the antioxidants in accordance with this invention are the lead oxides and the lead salts of unsaturated aliphatic carboxylic acids, aromatic carboxylic acids, or carbonic acid. The carboxylic acid salts most preferably will be polybasic lead salts of olefinic or aromatic polycarboxylic acids. Typical of these carboxylic acid salts are tribasic lead maleate, dibasic lead phthalate, dibasic lead isophthalate, lead dehydroabietate, etc. The lead salts of carbonic acid include both lead carbonate, $PbCO_3$ and basic lead carbonate, $2PbCO_3 \cdot Pb(OH)_2$. The lead oxides include lead suboxide $Pb_2O$, lead monoxide PbO, lead dioxide $PbO_2$, lead sesquioxide $Pb_2O_3$ and red lead $Pb_3O_4$. Mixtures of two or more of the lead compounds can also be used.

As stated before, at least one nitrogen containing antioxidant is used in combination with at least one of the lead compounds. Any of the well-known nitrogen containing rubber antioxidants can be used. Exemplary of the most preferable antioxidants are the naphthylamines such as phenyl-α-naphthylamine, phenyl-β-naphthylamine, etc.; the phenylenediamines such as N,N'-diphenyl-p-phenylenediamine, N-(ethoxyethyl)-p-phenylenediamine, N,N'-di-sec-butyl-p-phenylenediamine, N-phenyl-N'-cyclohexyl-p-phenylenediamine, symmetrical di-β-naphthyl-p-phenylenediamine, etc.; the diphenylamines such as 4,4-diaminodiphenylamine, p-(p-toluene sulfonylamido)-diphenylamine, di-p-methoxy-diphenylamine, octylated diphenylamine, heptylated diphenylamine, N-nitroso-diphenylamine, 4-cyclohexylamino diphenylamine, 4'-tert-amyl-2,4-diaminodiphenylamine, the condensation product of diisobutylene and diphenylamine, etc.; the aminophenols such as N-butylaminophenol, N-methyl-N-amylaminophenol, N-isooctyl-p-aminophenol, etc.; the aminodiphenylmethanes such as 4,4-diaminodiphenylmethane, etc.; the aryl-substituted alkylenediamines such as 1,2-di-o-toluidoethane, 1,2-dianilinoethane, 1,2-dianilinopropane, etc.; the aminobiphenyls such as 5-hydroxy-2-aminobiphenyl, etc.; the reaction products of an aldehyde or ketone with an amine such as the reaction product of acetone and phenyl-β-naphthylamine, the reaction product of acetone and diphenylamine, the reaction product of butyraldehyde and aniline, the reaction product of acetaldehyde and aniline, disalicylal ethylenediamine, disalicylal propylenediamine, aldol-α-naphthylamine; the reaction product of a complex diarylamineketone-aldehyde and N,N'-diphenyl-p-phenylenediamine sold under the tdademark "Flexamine," etc.; the quinolines such as 1,2-dihydro-2,2,4-trimethyl-6-phenylquinoline, 6-ethoxy-1,2-dihydro-2,2,4-trimethylquinoline, polymerized trimethyldihydroquinoline, etc.; the morpholines such as N-(p-hydroxyphenyl)-morpholine, etc.; the amidines such as N,N'-bis(hydroxyphenyl)-amidine, etc.; the dithiocarbamates such as nickel dibutyldithiocarbamate, zinc dimethyldithio-carbamate, zinc dioctyldithiocarbamate, zinc diisopropyldithiocarbamate, zinc methylethyldithiocarbamate, etc.; the acridans such as 9,9'-dimethylacridan, etc.; the mercaptobenzimidazoles such as nickel mercaptobenzimidazolate, zinc mercaptobenzimidazolate, etc.; the guanidine salts of dipyrocatechol borate such as di-o-tolylguanidine salt of dipyrocatechol borate, etc.; the mercaptobenzothiazoles such as zinc mercaptobenzothiazolate, nickel mercaptobenzothiazolate, etc.; and the mercaptoimidazoles such as 2-mercaptoimidazoline, its nickel salt, etc.

The two stabilizers, i.e., the lead compound and nitrogen containing antioxidant, can be admixed with the polymer composition by any of the usual procedures for incorporating a stabilizer in a solid material. While the stabilizers will usually be incorporated in the polymer at the time of its preparation, they can be admixed with the polymeric composition together or separately at any time before processing. In any event, it is always advisable to add at least part of the antioxidant as soon as the polymer is prepared. Of course, it is obvious that the sooner both stabilizers are incorporated, the less chance there will be for degradation. It should also be pointed out that there are other advantages in adding both stabilizers as soon as possible, as for example, it has been found that their presence essentially eliminates the troublesome characteristics of some poly(epihalohydrins) to adhere to metal surfaces as in drying apparatus.

The amount of the lead compound and antioxidant incorporated in the polymeric composition can be varied from a very small stabilizing amount up to a large excess, i.e., 50 to 100% but outstanding results have been obtained when from about 3% to about 25% of the lead compound by weight of the polymer is used in combination with from about 0.1% to about 5.0% of antioxidant by weight of the polymer.

The stabilized compositions of this invention can be readily cross-linked, i.e., vulcanized, with a polyamine to yield vulcanizates possessing excellent heat aging resistance. In addition the vulcanizable stabilized compositions have better scorch resistance, i.e., resistance to precuring, than have nonstabilized compositions.

The cross-linking can be accomplished by heating a mixture of the stabilized polymer composition and at least one polyamine to an elevated temperature for a short time. The temperature at which the cross-linking is effected can be varied over a wide range and depends, to some extent, upon the type of amine being used. In general, however, the cross-linking temperature will be within the range of from about 120° C. to about 175° C. The period of time at which the composition is held at elevated temperature will vary inversely with the temperature but will be within the range of from about 5 to about 60 minutes.

The polyamine can be incorporated or admixed with the stabilized polymer composition in any desired fashion. For example, the polyamine and polymer composition can be uniformly blended by simple milling on a conventional rubber mill. By this means the cross-linking agent is uniformly distributed throughout the composition and uniform cross-linking is effected when the blend is subjected to heat. Other methods of incorporating the cross-linking agent will be apparent to those skilled in the art. Any amount of polyamine can be added depending upon the degree of cross-linking desired. However, as stated before by using a stabilized composition of this invention it is possible to cross-link with less polyamine cross-linking agent than would otherwise be necessary and still obtain a good state of cure. Generally, from about 0.25% to about 8%, and preferably from about 0.5% to about 4%, of polyamine based on the weight of the polymer will give an excellent cross-linked product.

Any organic compound containing two or more amino groups can be used as the cross-linking agent in accordance with this invention. Exemplary of one of the preferred types of polyamine cross-linking agents are ethylenediamine, diethylenetriamine, hexamethylenediamine, p-phenylenediamine, hexamethylenediamine carbamate, etc. Exemplary of another preferred type of polyamine cross-linking agents are the ketopolyamines and thioketopolyamines such as urea, biuret, thiourea, dibutyl thiourea, trimethyl thiourea, etc. Mixtures of two or more polyamines can also be used as the cross-linking agent in accordance with this invention.

In addition to the above-mentioned stabilizers and polyamine cross-linking agents it may be desirable to incorporate additional ingredients in the composition such as extenders, fillers, pigments, plasticizers, light absorbers, etc. The presence of a filler such as carbon black is particularly beneficial in stabilized amorphous poly(epihalohydrin) vulcanizates. Also, the presence of a small amount of the cadmium-barium complex sold under the trademark "Mark WS" may further enhance the resistance of the stabilized composition to heat, light and oxidation. However, the presence or absence of such additional ingredients is immaterial to this invention.

The following examples are presented for purposes of illustration, parts and percentages being by weight unless otherwise specified.

EXAMPLES 1–11

Eleven samples of a poly(epichlorohydrin) having a molecular weight greater than 750,000 were cross-linked with hexamethylenediamine carbamate. Samples 2 and 4–11 contained one part per 100 of phenyl-β-napthylamine, added during isolation of the polymer. The formulation of each sample was as follows:

| Examples | 1 | 2 | 3 | 4 | 5 | 6 | 7 | 8 | 9 | 10 | 11 |
|---|---|---|---|---|---|---|---|---|---|---|---|
| Polymer containing no antioxidant, parts | 100 | | 100 | | | | | | | | |
| Polymer containing antioxidant, parts | | 100 | | 100 | 100 | 100 | 100 | 100 | 100 | 100 | 100 |
| Dibasic lead phthalate, parts | | | 5 | 5 | | | | 2.5 | | | |
| Tribasic lead maleate, parts | | | | | 5 | | | | | | |
| Basic lead carbonate, parts | | | | | | 5 | | 2.5 | | | |
| Lead carbonate, parts | | | | | | | 5 | | | | |
| Lead monooxide, parts | | | | | | | | | 5.6 | | |
| Lead dioxide, parts | | | | | | | | | | 5.6 | |
| Red lead, parts | | | | | | | | | | | 5.6 |
| Fast extruding furnace black, parts | 50 | 50 | 50 | 50 | 50 | 50 | 50 | 50 | 50 | 50 | 50 |
| Hexamethylenediamine carbamate, parts | 1 | 1 | 1 | 1 | 1 | 1 | 1 | 1 | 1 | 1 | 1 |

Each formulation was compounded on a two-roll mill at a temperature of 15–20° C. for 20 minutes and then allowed to stand before curing. A sample of each formulation was then cured in a preheated aluminum mold under a pressure of 500 p.s.i. at a temperature of 155° C. for 45 minutes. The properties of the vulcanizates were determined and are set forth in Table I.

*Table I*

| Examples | Modulus at 200% elongation, p.s.i. | | Tensile strength, p.s.i. | | Elongation, percent | |
|---|---|---|---|---|---|---|
| | Unaged | Aged [a] | Unaged | Aged [a] | Unaged | Aged [a] |
| 1 | 670 | 580 | 720 | 360 | 300 | 320 |
| 2 | 1,090 | [b]<400 | 1,600 | 340 | 520 | 180 |
| 3 | [b]<400 | [b]<400 | 840 | 900 | 110 | 120 |
| 4 | 1,105 | 1,340 | 1,895 | 1,510 | 390 | 260 |
| 5 | 1,575 | 1,240 | 2,160 | 1,560 | 320 | 300 |
| 6 | 2,000 | 1,530 | 2,400 | 1,820 | 280 | 280 |
| 7 | 1,205 | 1,200 | 2,010 | 1,450 | 400 | 310 |
| 8 | 1,430 | 1,870 | 1,990 | 1,960 | 360 | 220 |
| 9 | 1,345 | 980 | 1,930 | 1,400 | 320 | 360 |
| 10 | 1,300 | 965 | 1,870 | 1,340 | 380 | 360 |
| 11 | 1,175 | 970 | 1,940 | 1,330 | 400 | 360 |

[a] Aged for two days at a temperature of 150° C. in a circulating air oven.
[b] The value was too low to determine on the equipment being used.

EXAMPLES 12–15

Four samples of a poly(epichlorohydrin) having a molecular weight of 760,000 and containing one part per 100 of phenyl-β-naphthylamine, added during isolation of the polymer, were cross-linked with hexamethylenediamine carbamate. To samples 12 and 13 were added lead compounds of the instant invention. To samples 14 and 15 were added commercial products known to be useful in the stabilization of poly(vinyl chloride). The formulation of each sample was as follows:

| Examples | 12 | 13 | 14 | 15 |
|---|---|---|---|---|
| Polymer, Parts | 100 | 100 | 100 | 100 |
| High abrasion furnace black, Parts | 50 | 50 | 50 | 50 |
| Hexamethylenediamine carbamate, Parts | 1 | 1 | 1 | 1 |
| Dibasic lead phthalate, Parts | 5 | | | |
| Basic lead carbonate, Parts | | 5 | | |
| Dibasic lead stearate, Parts | | | 5 | |
| Zinc oxide, Parts | | | | 5 |

Each formulation was compounded and cured as described in Examples 1–11. The properties of the resulting vulcanizates were determined and are set forth in Table II.

*Table II*

| Examples | Modulus at 200% Elongation, p.s.i. | | Tensile strength, p.s.i. | | Elongation, percent | | Break set, percent | |
|---|---|---|---|---|---|---|---|---|
| | Unaged | Aged [a] | Unaged | Aged [a] | Unaged | Aged [a] | Unaged | Aged [a] |
| 12 | 1,105 | 1,340 | 1,895 | 1,510 | 390 | 260 | 20 | 30 |
| 13 | 2,000 | 1,530 | 2,400 | 1,820 | 280 | 280 | 0 | 10 |
| 14 | 930 | 575 | 1,445 | 600 | 420 | 220 | 20 | 60 |
| 15 | 715 | [b]<400 | 990 | 575 | 510 | [b]<50 | 10 | 25 |

[a] Aged at a temperature of 150° C. for 2 days in a circulating air oven.
[b] The value was too low to determine on the equipment being used.

EXAMPLES 16–21

Six samples of a poly(epichlorohydrin) having a molecular weight of 880,000 were cross-linked with hexamethylenediamine carbamate in the presence of either lead phthalate or basic lead carbonate and three different antioxidants. In each sample one half of the antioxidant was added during the workup of the polymer and the other half during the compounding of the lead salt. The formulation of each sample was as follows:

| Examples | 16 | 17 | 18 | 19 | 20 | 21 |
|---|---|---|---|---|---|---|
| Polymer, Parts | 100 | 100 | 100 | 100 | 100 | 100 |
| Fast extruding furnace black, Parts | 50 | 50 | 50 | 50 | 50 | 50 |
| Lead phthalate, Parts | 5 | | 5 | | 5 | |
| Basic lead carbonate, Parts | | 5 | | 5 | | 5 |
| Hexamethylenediamine carbamate, Parts | 1 | 0.75 | 1 | 0.75 | 1 | 0.75 |
| Polymerized trimethyl-dihydroquinoline, Parts | 2 | 2 | | | | |
| Sym-di-β-naphthyl-p-phenylenediamine, Parts | | | 2 | 2 | | |
| Diphenylamine-acetone reaction product, Parts | | | | | 2 | 2 |

Each formulation was compounded and cured as described in Examples 1–11. The properties of the resulting vulcanizates were determined and are set forth in Table III.

*Table III*

| Examples | Modulus at 200% elongation, p.s.i. | | Tensile strength, p.s.i. | | Elongation, percent | |
|---|---|---|---|---|---|---|
| | Unaged | Aged a | Unaged | Aged a | Unaged | Aged a |
| 16 | 1,560 | 1,330 | 2,090 | 1,500 | 380 | 280 |
| 17 | 1,460 | 1,500 | 2,040 | 1,840 | 400 | 300 |
| 18 | 1,600 | 1,780 | 2,080 | 2,020 | 360 | 260 |
| 19 | 1,390 | 1,330 | 2,010 | 1,630 | 400 | 360 |
| 20 | 1,530 | 1,580 | 2,100 | 1,840 | 400 | 280 |
| 21 | 1,450 | 1,170 | 2,020 | 1,360 | 400 | 320 | a Aged at a temperature of 150° C. for 2 days in a circulating air oven.

EXAMPLES 22 AND 23

Two samples of a poly(epichlorohydrin) having a molecular weight of 880,000 and containing one part per 100 of phenyl-β-naphthylamine, added during the workup of the polymer, were cross-linked with hexamethylenediamine carbamate in the presence of at least one lead compound, a cadmium-barium complex and polymerized trimethyldihydroquinoline. The formulation of each sample was as follows:

| Examples | 22 | 23 |
|---|---|---|
| Polymer, parts | 100 | 100 |
| Fast extruding furnace black, parts | 50 | 50 |
| Dibasic lead phthalate, parts | 5 | 2.5 |
| Basic lead carbonate, parts | | 2.5 |
| Cadmium-barium complex, parts | 1.0 | 1.0 |
| Polymerized trimethyldihydroquinoline, parts | 1.0 | 1.0 |
| Hexamethylenediamine carbamate, parts | 1.0 | 1.0 |

The formulations were compounded and cured as described in Examples 1–11. The properties of the resulting vulcanizates were determined and are set forth in Table IV.

*Table IV*

| Examples | Modulus at 200% Elongation, p.s.i. | | Tensile strength, p.s.i. | | Elongation, percent | | Mooney Scorch, 5 points, a min. |
|---|---|---|---|---|---|---|---|
| | Unaged | Aged b | Unaged | Aged b | Unaged | Aged b | |
| 22 | 1,270 | 1,670 | 1,790 | 1,820 | 380 | 240 | 10.5 |
| 23 | 1,310 | 1,890 | 1,920 | 1,960 | 380 | 220 | 9 | a The time to reach a 5-point rise in viscosity above the minimum reading as determined on compounded uncured stock at 132° C.
b Aged for 52 hours at a temperature of 150° C.

EXAMPLES 24 AND 25

Two samples of a propylene oxide-epichlorohydrin copolymer containing 55 weight percent of propylene oxide and having a molecular weight greater than 450,000 were cross-linked with hexamethylenediamine carbamate. The cross-linking of the sample in Example 24 was conducted in the presence of basic lead carbonate. Each sample contained one part per 100 of phenyl-β-naphthylamine, which was added during the isolation of the polymer. The formulation of each sample was as follows:

| Examples | 24 | 25 |
|---|---|---|
| Copolymer, parts | 100 | 100 |
| Fast extruding furnace black, parts | 50 | 50 |
| Basic lead carbonate, parts | 5 | |
| Polymerized trimethyldihydroquinoline, parts | 1.0 | 1.0 |
| Hexamethylenediamine carbamate, parts | 2.0 | 2.0 |

The formulations were compounded and cured as described in Examples 1–11. The sample which contained no basic lead carbonate (Example 25) yielded a vulcanizate of poor properties which upon aging for 2 days at 150° C. become so embrittled it could not be tested. On the other hand the sample containing the lead compound (Example 24) yielded a vulcanizate of good properties and exhibited a much higher degree of resistance to heat aging.

EXAMPLE 26

A sample of a poly(epichlorohydrin) having a molecular weight of 880,000 and containing one part per 100 of phenyl-β-naphthylamine, added during the isolation of the polymer, was cross-linked with p-phenylenediamine. The formulation was as follows:

|  | Parts |
|---|---|
| Polymer | 100 |
| Fast extruding furnace black | 50 |
| Basic lead carbonate | 5 |
| Polymerized trimethyldihydroquinoline | 1.0 |
| p-Phenylenediamine | 2.0 |

The formulation was compounded and cured as described in Examples 1–11, except that the formulation was cured for 15 minutes instead of 45 minutes. The properties of the resulting vulcanizate were determined and are tabulated below:

| | |
|---|---|
| Modulus at 100% elongation, p.s.i. | 970 |
| Tensile strength, p.s.i. | 1830 |
| Elongation, percent | 185 |
| Shore hardness (A–2) | 75 |

Little change was noted in the properties of the vulcanizate after heat aging.

EXAMPLES 27 AND 28

Two samples of poly(epichlorohydrin) were isolated from the reaction product mixture of a polymerization of epichlorohydrin in toluene using a triisobutyl aluminum-water catalyst complex. In Example 27 the isolation was carried out in the presence of a lead compound and an antioxidant while in Example 28 the lead compound was omitted. The reaction product mixture used contained a poly(epichlorohydrin) having a molecular weight of 560,000 and was calculated to be 23.6% solids. In addition to the polymer, the toluene diluent and the small amount of catalyst, the mixture contained a small amount of n-heptane (in which the catalyst was added), small amounts of ethyl alcohol and benzene (used to stop the polymerization reaction) and 1.2% phenyl-β-naphthylamine antioxidant (based on the polymer) which was added with the alcohol and benzene. Each sample was isolated as follows: Approximately 4.5 gallons of reaction mixture was added to a 10-gallon stainless steel mixer, equipped with a heating jacket, two sigma-shaped mixing blades, a distillation column and a vacuum pump. In each case the mixture was agitated at a jacket temperature of 102–103° C. In Example 27, 5% of basic lead carbonate (based on the polymer) was added as a paste in toluene before the heating started. After heating and agitating for 5 hours the pressure in the mixer was gradually reduced over a period of 2 hours from about 600 mm. of mercury to about 100 mm. of mercury. At this time the sample which contained no lead compound (Example 28) had degraded badly and stuck to the blades and sides of the mixer so tenaciously that it had to be dismantled, scraped and cleaned before it could be reused. The sample containing the lead compound (Example 27) did not appear to degrade and could easily be removed from the mixer.

EXAMPLES 29–34

Six samples of a poly(epichlorohydrin) having a molecular weight of 880,000 and containing one part per 100 of phenyl-β-naphthylamine, added during the work-up of the polymer, were cross-linked with different polyamines in the presence of polymerized trimethyldihydroquinoline. Basic lead carbonate was present during the cross-linking in each example except Example 30. The formulation of each sample was as follows:

| Examples | 29 | 30 | 31 | 32 | 33 | 34 |
|---|---|---|---|---|---|---|
| Polymer, Parts | 100 | 100 | 100 | 100 | 100 | 100 |
| Fast extruding furnace black, Parts | 50 | 50 | 50 | 50 | 50 | 50 |
| Polymerized trimethyl-dihydroquinoline, Parts | 1.0 | 1.0 | 1.0 | 1.0 | 1.0 | 1.0 |
| Basic lead carbonate, Parts | 5.0 | | 5.0 | 5.0 | 5.0 | 5.0 |
| Urea, Parts | 0.75 | 0.75 | | | | |
| Biuret, Parts | | | 0.75 | | | |
| Thiourea, Parts | | | | 0.75 | | |
| Dibutyl thiourea, Parts | | | | | 0.75 | |
| Trimethyl thiourea, Parts | | | | | | 1.28 |

Each formulation was compounded and cured as described in Examples 1–11. The properties of the resulting vulcanizates were determined and set forth in Table V.

Table V

| Examples | Modulus at 100% Elongation, p.s.i. | | Tensile strength, p.s.i. | | Elongation, percent | | Break set, percent | |
|---|---|---|---|---|---|---|---|---|
| | Unaged | Aged a | Unaged | Aged a | Unaged | Aged a | Unaged | Aged a |
| 29 | 595 | 1,775 | 1,845 | 2,290 | 390 | 140 | 15 | 0 |
| 30 | 510 | 225 | 1,395 | 355 | 510 | 145 | 30 | 70 |
| 31 | 480 | 1,485 | 1,645 | 2,240 | 470 | 165 | 15 | 0 |
| 32 | 535 | 1,120 | 1,655 | 1,550 | 360 | 140 | 10 | 0 |
| 33 | 505 | 730 | 1,140 | 1,660 | 585 | 375 | 40 | 10 |
| 34 | 680 | 1,290 | 1,810 | 2,530 | 410 | 215 | 0 | 0 | a Aged at a temperature of 150° C. for 3 days.

EXAMPLE 35

A sample of a poly(epichlorohydrin) having a molecular weight of approximately 550,000 and containing one part per 100 of nickel dibutyldithiocarbamate, added during isolation of the polymer, was cross-linked with ethylene thiourea. The formulation was as follows:

| | Parts |
|---|---|
| Polymer | 100 |
| Fast extruding furnace black | 50 |
| Zinc stearate | 1.0 |
| Red lead | 5.0 |
| Nickel dibutyldithiocarbamate | 1.0 |
| Ethylene thiourea | 1.5 |

The formulation was compounded and cured as described in Examples 1–11. The properties of the resulting vulcanizate were determined and are tabulated below:

| | Unaged | Aged a |
|---|---|---|
| Modulus at 100% elongation, p.s.i. | 1,800 | |
| Tensile strength, p.s.i. | 2,125 | 2,250 |
| Elongation, percent | 260 | 150 |
| Shore hardness (A–2) | 76 | 83 | a Aged for 5 days at a temperature of 150° C. in a circulating air oven.

EXAMPLE 36

A sample of an ethylene oxide-epichlorohydrin copolymer containing 50 weight percent of ethylene oxide and having a molecular weight greater than 500,000 and containing one part per 100 of nickel dibutyldithiocarbamate, added during isolation of the coplymer, was cross-linked with ethylene thiourea. The formulation was as follows:

| | Parts |
|---|---|
| Copolymer | 100 |
| Fast extruding furnace black | 50 |
| Zinc stearate | 0.75 |
| Red lead | 5.0 |
| Nickel dibutyldithiocarbamate | 1.0 |
| Ethylene thiourea | 1.5 |

The formulation was compounded and cured as described in Examples 1–11. The properties of the resulting vulcanizate were determined and are tabulated below:

| | |
|---|---|
| Modulus at 100% elongation, p.s.i. | 1840 |
| Tensile strength, p.s.i. | 2200 |
| Elongation, percent | 300 |
| Shore hardness (A–2) | 77 |

Little change was noted in the properties of the vulcanizate after heat aging for 3 days at 150° C. in a circulating air oven.

What I claim and desire to protect by Letters Patent is:

1. A stabilized epihalohydrin polymer composition comprising an epihalohydrin polymer having a molecular weight of at least about 40,000 and in intimate admixture therewith a stabilizing amount of at least one nitrogen containing autioxidant in combination with a stabilizing amount of at least one lead compound selected from the group consisting of lead salts of unsaturated aliphatic carboxylic acids, lead salts of aromatic carboxylic acids, lead salts of carbonic acid and lead oxides.

2. The composition of claim 1 wherein the epihalohydrin polymer is poly(epichlorohydrin).

3. A stabilized vulcanizable epihalohydrin polymer composition comprising an epihalohydrin polymer having a molecular weight of at least about 40,000 and in intimate admixture therewith
 (a) at least one polyamine cross-linking agent selected from the group consisting of alkylenediamines, alkylenetriamines, alkylenediamine carbamates, ketopolyamines and thioketopolyamines,
 (b) at least one nitrogen containing antioxidant selected from the group consisting of naphthylamines, phenylenediamines, diphenylamines, aminophenols, aminodiphenyl methanes, aryl substituted alkylenediamines, aminobiphenyls, the reaction products of an aldehyde with an amine, the reaction products of a ketone with an amine, quinolines, morpholines, amidines, dithiocarbamates, acridans, mercaptobenzimidazoles, the guanidine salts of dipyrocatechol borate, mercaptobenzothiazoles and mercaptomidazoles, and
 (c) at least one lead compound selected from the group consisting of lead salts of unsaturated aliphatic carboxylic acids, lead salts of aromatic carboxylic acids, lead salts of carbonic acid and lead oxides.

4. The composition of claim 3 wherein the epihalohydrin polymer is poly(epichlorohydrin).

5. The composition of claim 3 wherein the epihalohydrin polymer is an epichlorohydrin-propylene oxide copolymer.

6. The composition of claim 3 wherein the antioxidant is phenyl-β-naphthylamine.

7. The composition of claim 3 wherein the antioxidant is polymerized trimethyldihydroquinoline.

8. The composition of claim 3 wherein the antioxidant is sym-di-β-naphthyl-p-phenylenediamine.

9. The composition of claim 3 wherein the antioxidant is the reaction product of diphenylamine and acetone.

10. The composition of claim 3 wherein the antioxidant is a dithiocarbamate.

11. The composition of claim 3 wherein the polyamine cross-linking agent is hexamethylenediamine carbamate.

12. The composition of claim 3 wherein the epihalohydrin polymer is an epichlorohydrin-ethylene oxide copolymer.

13. The composition of claim 3 wherein the polyamine cross-linking agent is urea.

14. The composition of claim 3 wherein the polyamine cross-linking agent is a thiourea.

15. The composition of claim 3 wherein the lead compound is basic lead carbonate.

16. The composition of claim 3 wherein the lead compound is tribasic lead maleate.

17. The composition of claim 3 wherein the lead compound is dibasic lead phthalate.

18. The composition of claim 3 wherein the lead compound is a mixture of dibasic lead phthalate and basic lead carbonate.

19. The composition of claim 3 wherein the lead compound is a lead oxide.

20. A stabilized epihalohydrin polymer having a molecular weight of at least about 40,000 cross-linked with a polyamine selected from the group consisting of alkylenediamines, alkylenetriamines, alkylenediamine carbamates, ketopolyamines and thioketopolyamines and containing a stabilizing amount of at least one nitrogen containing antioxidant selected from the group consisting of naphthylamines, phenylenediamines, diphenylamines, aminophenols, aminodiphenyl methanes, aryl substituted alkylenediamines, aminobiphenyls, the reaction products of an aldehyde with an amine, the reaction products of a ketone with an amine, quinolines, morpholines, amidines, dithiocarbamates, acridans, mercaptobenzimidazoles, the guanidine salts of dipyrocatechol borate, mercaptobenzothiazoles and mercaptoimidazoles, in combination with a stabilizing amount of at least one lead compound selected from the group consisting of lead salts of unsaturated aliphatic carboxylic acids, lead salts of aromatic carboxylic acids, lead salts of carbonic acid and lead oxides.

No references cited.

LEON J. BERCOVITZ, *Primary Examiner.*